April 17, 1951     F. H. LAWRENZ     2,549,213
SUBIRRIGATOR AND SOIL FERTILIZER
Filed July 2, 1946
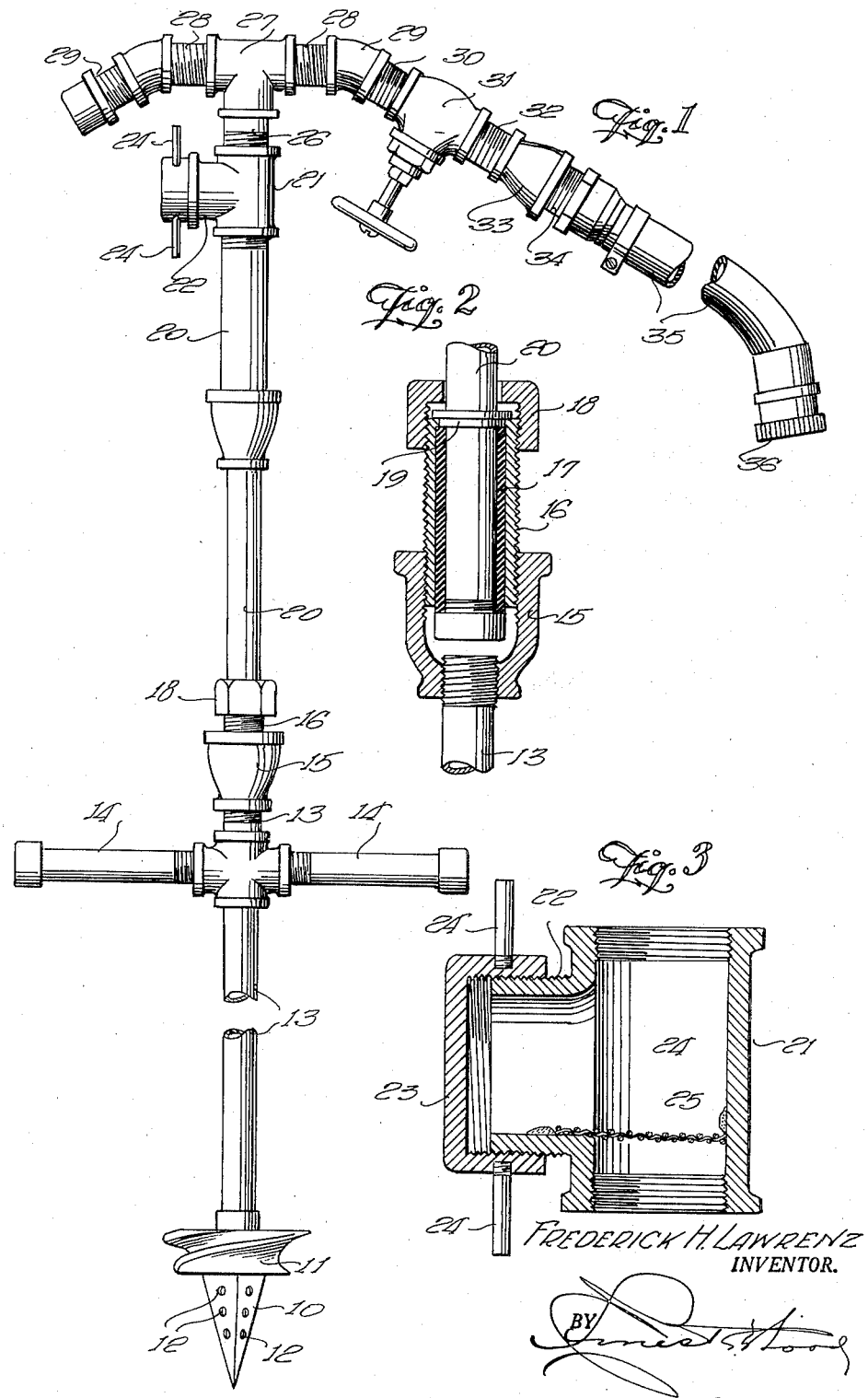

Patented Apr. 17, 1951

2,549,213

UNITED STATES PATENT OFFICE 2,549,213

SUBIRRIGATOR AND SOIL FERTILIZER

Frederick H. Lawrenz, Dallas, Tex.

Application July 2, 1946, Serial No. 680,989

2 Claims. (Cl. 285—97.5)

This invention relates to soil irrigation and fertilization and has particular reference to apparatus for sub-irrigating and fertilizing the soil.

The principal object of this invention is to provide a device which may be thrust but preferably screwed into the soil and to which may be attached a common garden hose, thus providing a medium by which water may be introduced into the soil adjacent the plants, thus insuring an adequate supply of water to the roots thereof and eliminating the practice of spraying water directly onto the plants which is detrimental especially in localities where any water has a chemical content or nature that would burn or otherwise injure the delicate fibers of the plants. By introducing water at the roots of the plants it has been found that in the case of flowering plants, the blossoms will be more luxuriant and the coloring of the blossoms more striking than in cases where the water is sprayed directly on the foliage or even on the surface of the ground adjacent the roots or stalks thereof.

Another object of the invention is to provide a sub-irrigator having optional means for fertilizing plants at the roots, said fertilizing means consisting of a chamber in which is deposited a fertilizing agent which is dissolved by the passage of water downwardly through the irrigator into the perforated augur thereof. Moreover, the invention provides an improved form of augur in that a portion thereof seals the hole made thereby of the upward passage of water and fertilizing material, thus straining the water and entraining the fertilizing material to find its own lateral passages in fissures in the soil.

Still another object of the invention is to provide a sub-irrigating apparatus having a stationary portion to which is attached a garden hose and a rotatable portion which carries a bit or augur and is adapted to be screwed into the ground at any desired depth.

With the foregoing objects as paramount the invention has further reference to certain features of accomplishment which will become apparent as the description proceeds, taken in connection with the accompanying drawings wherein:

Figure 1 is a side elevational view of a subirrigator and fertilizer constructed according to the present invention.

Figure 2 is a detail view of the packing gland in vertical section, and

Figure 3 is a detail view of the fertilizing chamber in vertical section.

Continuing with a more detailed description of the drawing, reference is primarily made to Figure 1 in which reference numeral 10 denotes the pilot point of augur 11, which point is preferably square and cross-sectioned and is provided with apertures 12. It will be observed that the augur 11 is of greater diameter than the pilot point 10 in order to preclude upward passage of water emerging through the apertures 12 and trains the water to move in a laterally direction, following fissures in the soil for making its own passages under pressure composed thereof.

The augur 11 is attached to the lower end of a hollow stem 13, the latter, in turn, having lateral handles 14 by which the stem and the augur may be rotated into the earth. Connected to the upper end of the stem 13 is a fitting 15 which threadedly receives a nipple 16, containing a packing element 17. A cap 18 is threaded on the opposite end of the nipple 16 and retains the head 19 of a tubular member 20 which is a part of the stationary upper portion of the sub-irrigator.

Continuing upwardly the stem 20 is threaded to receive the T 21 whose threaded lateral 22 receives the cap 23 having arms 24 pending therefrom serving as handles by which the cap is supplied to and removed from the said lateral 22. The main body of the T 21 is applied with a chamber 24 for retaining a suitable fertilizing agent which rests upon the screen 25 and being solvent, is gradually disintegrated by the water passing through the T into the stationary portion 20 of the sub-irrigator.

Threaded into the upper end of the T 21 is a nipple 26 which receives a second and smaller T 27 having laterals 28 which with attachment 29 serve as a handle for rotating the member 20.

Attached to one of the fittings 29 is a nipple 30, to which in turn is attached the valve 31, followed by a second nipple 32 and a reducer 33 which latter provides a connection 34 for a common garden hose 35. A female connection 36 of the garden hose is adapted to be joined to an ordinary municipal water outlet, not shown.

In operation, after a suitable location is elected, the bit or augur 11 is thrust into the ground and handles 14 are rotated in order to sink the member 13 to a suitable or desirable depth into the soil. Since the lower portion of the irrigating device is rotatable, the hose 35 may remain attached to the valve or upper portion of the irrigator while the lower portion thereof is screwed into the soil. After the proper depth has been reached the water at the faucet is turned on which flows through the hose 35, through valve 31, then downward through the pipe 20 and into the hollow stem 13 and finally through the apertures 12 in the pilot 10 of the bit 11 and by virtue of the municipal pressure on the water passing through the hose and the irrigator, the water flows laterally outwardly but is strained by the bits 11 from moving upwardly through the hole made thereby parallel to the hollow stem 13 and then outwardly to the surface. Instead, water is strained to flow in fissures in the soil made thereby or in natural openings therein into close contact with the roots of the plant to be irrigated.

If necessary or desirable a suitable fertilizing agent of a soluble nature may be placed in the chamber 24 which is disintegrated by the water passing therethrough and flows downwardly through the hollow stem 13 and becomes entrained with the water and the latter emerges through the apertures 12 to the pilot of the bit 11.

It is clearly apparent, while the drawing shows the apparatus as being made up of sections of pipe and suitable fittings no restrictions as to structure is intended since the upper and lower parts of the apparatus can be made of one or more pieces as may be found best suited to the economy of manufacture.

Manifestly, the constructions as shown and described is capable of some modification and such modification as may be construed to fall within the scope and meaning of the appended claims is also considered to be within the spirit and intent of the invention.

What is claimed is:

1. A swivel pipe joint including an upper stationary pipe section having a collar affixed thereon and spaced upwardly from its lower end, a lower rotatable pipe section, a reducer threaded on said lower pipe section, a nipple threaded in said reducer, an apertured cap threaded on the upper end of said nipple and adapted to rotatably receive the lower end and collar of said upper pipe section, a packing sleeve surrounding the lower pipe section below said collar, and means threaded on the lower end of said upper pipe section to retain said packing sleeve.

2. A swivel pipe joint including upper and lower pipe sections, the former having a collar thereon spaced from its lower end, the lower of said sections being rotatable independently of said upper section, a nipple on the upper end of said lower pipe section and rotatably receiving the lower end and collar of said upper pipe section, means closing the upper end of said nipple about said latter pipe section above said collar, and a packing sleeve embracing the lower end of said upper pipe section.

FREDERICK H. LAWRENZ.

REFERENCES CITED

The following references are of record in the file of this patent:

UNITED STATES PATENTS

| Number | Name | Date |
|---|---|---|
| 551,527 | Cunningham | Dec. 17, 1895 |
| 2,214,083 | Lester | Sept. 10, 1940 |
| 2,227,105 | Pritchard | Dec. 31, 1940 |
| 2,242,789 | McFee | May 20, 1941 |

FOREIGN PATENTS

| Number | Country | Date |
|---|---|---|
| 8,852 | Austria | Aug. 25, 1902 |